H. SCHMALHAUSEN.
Trotting Gears.
No. 142,871. Patented September 16, 1873.
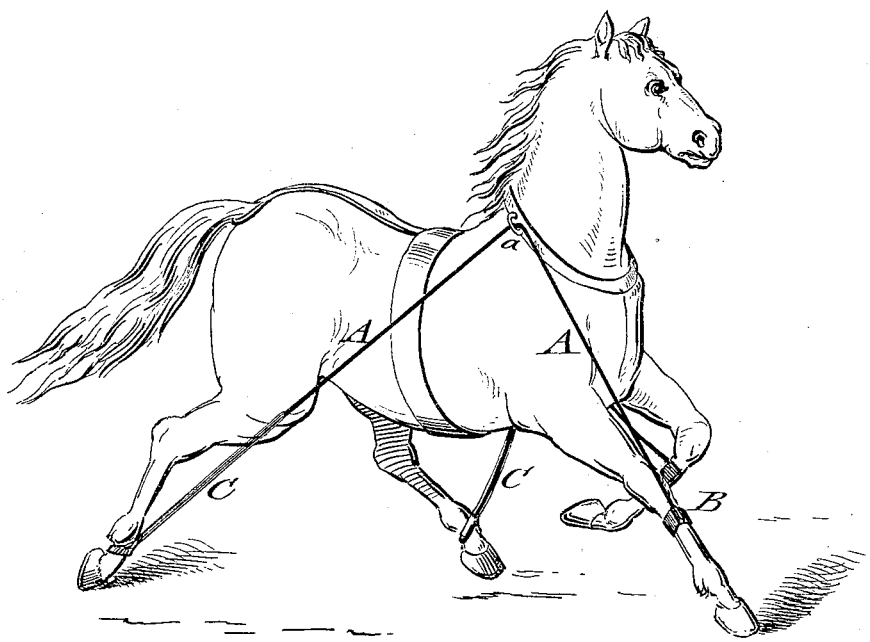
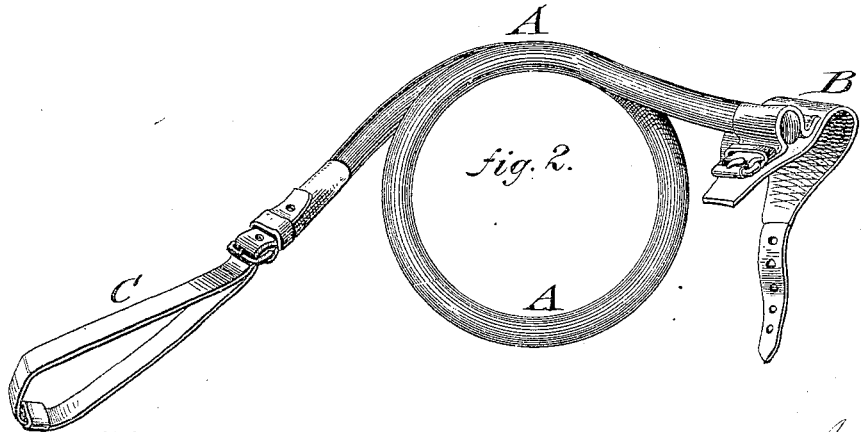

UNITED STATES PATENT OFFICE.

HENRY SCHMALHAUSEN, OF BRIDGEPORT, ILLINOIS.

IMPROVEMENT IN TROTTING-GEARS.

Specification forming part of Letters Patent No. 142,871, dated September 16, 1873; application filed August 16, 1873.

*To all whom it may concern:*

Be it known that I, HENRY SCHMALHAUSEN, of Bridgeport, in the county of Lawrence and State of Illinois, have invented a new and Improved Trotting-Gear, of which the following is a specification:

In the accompanying drawing, Figure 1 represents my improved elastic trotting-gear as applied to the feet of a horse, and Fig. 2 is a detail perspective view of the same.

Similar letters of reference indicate corresponding parts.

The object of my invention is to provide an elastic gear for horses, by which they can trot faster, raise their feet higher, and step higher, preventing them also from balking, kicking, backing, or rearing, and being specially useful for the breaking of colts, as it will develop the formation of the joints, produce a freer action of the legs, and give increased strength to the muscles and ligaments of the joints. My invention consists of an elastic strap, which is applied either to the fore or hind leg, passed through the hame-ring, and then connected with the corresponding hind or fore leg.

In the drawing, A represents the elastic strap, made of round or flat rubber, or of a coiled round or flat spring suitably covered. One end of strap A is firmly attached to a bolstered or cushioned strap, B, which is buckled either to the foreleg below the knee-joint or to the hind leg between the hoof and fetlock-joint. The other end of strap A is provided with a strap and buckle, C, forming an elongation of elastic strap A, by which it may be adjusted in length to feet and step of the horse. This end is passed through the hame-ring $a$, which also guides the lines, and then attached to the hind or fore leg, respectively. The gear is applied when the horse is standing, so as to be well stretched. If the strap B is buckled to the foreleg, the gear raises the knee to any desired height as soon as the horse raises the same. It may be so applied that the knee-joint will be raised to a level with the shoulder-joint, which throws the foreleg on the forward step into nearly a horizontal position. By shortening or lengthening the adjustable end-strap C, any degree of elevation from a low to a high step may be obtained. When the strap B is buckled to the hind leg, the elastic gear draws the foot forward as soon as the horse raises the same from the ground, and prevents and cures kicking, backing, &c. A horse may be trained with the gear and his action improved without any wear of the muscles which are mostly used in trotting, as it enhances greatly the muscular development and endurance of the horse.

Having thus described my invention, I claim as new and desire to secure by Letters Patent—

The trotting-gear consisting of the elastic main-strap A, with bolstered strap B at one end and adjustable strap C at the other end, used in connection with the hame-ring, and to be applied to the fore and hind leg, in the manner substantially as described.

HENRY SCHMALHAUSEN.

Witnesses:
JOHN RICHER,
J. EDWIN BLACK.